US008253689B2

(12) United States Patent
Lee et al.

(10) Patent No.: US 8,253,689 B2
(45) Date of Patent: Aug. 28, 2012

(54) SYSTEM AND METHOD FOR OUTPUTTING ICONS IN RESPONSE TO HOT-KEY INPUT (75) Inventors: Heun-jin Lee, Seoul (KR);
Kyoung-won Lee, Seongnam-si (KR);
Yun-ho Choi, Seongnam-si (KR);
Kyung-hee Lee, Suwon-si (KR);
Myung-hoon Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 987 days.

(21) Appl. No.: 11/505,949

(22) Filed: Aug. 18, 2006

(65) Prior Publication Data
US 2007/0061761 A1    Mar. 15, 2007

(30) Foreign Application Priority Data
Sep. 12, 2005 (KR) .................. 10-2005-0084775

(51) Int. Cl.
*G06F 3/02* (2006.01)
(52) U.S. Cl. ......................... 345/168; 341/22
(58) Field of Classification Search .......... 345/156–184; 341/21–23
See application file for complete search history.

(56) References Cited

U.S. PATENT DOCUMENTS

| 6,515,686 | B1 * | 2/2003 | Park et al. ............... 715/827 |
| 7,581,047 | B2 * | 8/2009 | Ilyasov ..................... 710/67 |
| 2003/0063071 | A1 * | 4/2003 | Wyatt ....................... 345/172 |
| 2003/0067446 | A1 * | 4/2003 | Ono et al. ................. 345/172 |
| 2005/0212979 | A1 * | 9/2005 | Morita et al. ............. 348/734 |

FOREIGN PATENT DOCUMENTS

| CN | 1467610 | 1/2004 |
| JP | 04-147327 | 5/1992 |
| JP | 08-286875 | 11/1996 |
| JP | 2000-222094 | 8/2000 |

OTHER PUBLICATIONS

Office Action issued on Jan. 15, 2008 by the Chinese Intellectual Property Office for Chinese Patent Application No. 2004101285973.

* cited by examiner

*Primary Examiner* — Kevin M Nguyen
*Assistant Examiner* — Cory Almeida
(74) *Attorney, Agent, or Firm* — Jefferson IP Law, LLP

(57) ABSTRACT

A system to output an icon in response to a hot-key input, including a microcomputer to sense an instruction input through a hot-key and to output a scan code corresponding to the instruction, a keyboard launcher to receive the scan code from the microcomputer, to analyze the scan code, and to generate a message that requests an output of a hot-key icon indicating the operation of the hot-key based on the analyzed scan code, a system basic input/output system (BIOS) to provide information required to output the hot-key icon, and a display manager to receive the message generated by the keyboard launcher and to output the hot-key icon based on the information received from the system BIOS.

17 Claims, 7 Drawing Sheets

SYSTEM AND METHOD FOR OUTPUTTING ICONS IN RESPONSE TO HOT-KEY INPUT

CROSS-REFERENCE TO RELATED APPLICATION

This application claims the benefit of Korean Patent Application No. 2005-84775 filed on Sep. 12, 2005 in the Korean Intellectual Property Office, the disclosure of which is incorporated herein by reference.

BACKGROUND OF THE INVENTION

1. Field of the Invention

Aspects of the present invention relate to an icon outputting system and an icon outputting method, and, more particularly, to a system and method of outputting icons in response to a hot-key input, which are capable of displaying an instruction input to a computing system through the hot-key in the form of an icon so that a user may relatively easily understand the input instruction.

2. Description of the Related Art

A hot-key is a kind of shortcut generally used for a computer or a portable digital terminal, and is used to directly display information on the state of a computer system (for example, information on the ON/OFF state of a sounder, the volume of the sounder, the ON/OFF state of a screen, the brightness of the screen, and the connection of a wireless device). Hot-keys used for direct access to wireless Internet may be provided in portable terminals of mobile communication providers, but the types of hot-keys may be different from each other. In a notebook computer system, for example, a combination of an Fn key and an F4 key (Fn+F4) is used as the hot-key. When an instruction is input through the hot-key, an icon corresponding to the function of the hot-key is output to a display device. In the current output method, the icon is output at the basic input/output system (BIOS) level, such as a system BIOS or a video BIOS, or, alternately, system information is output by an application.

Figure 1:
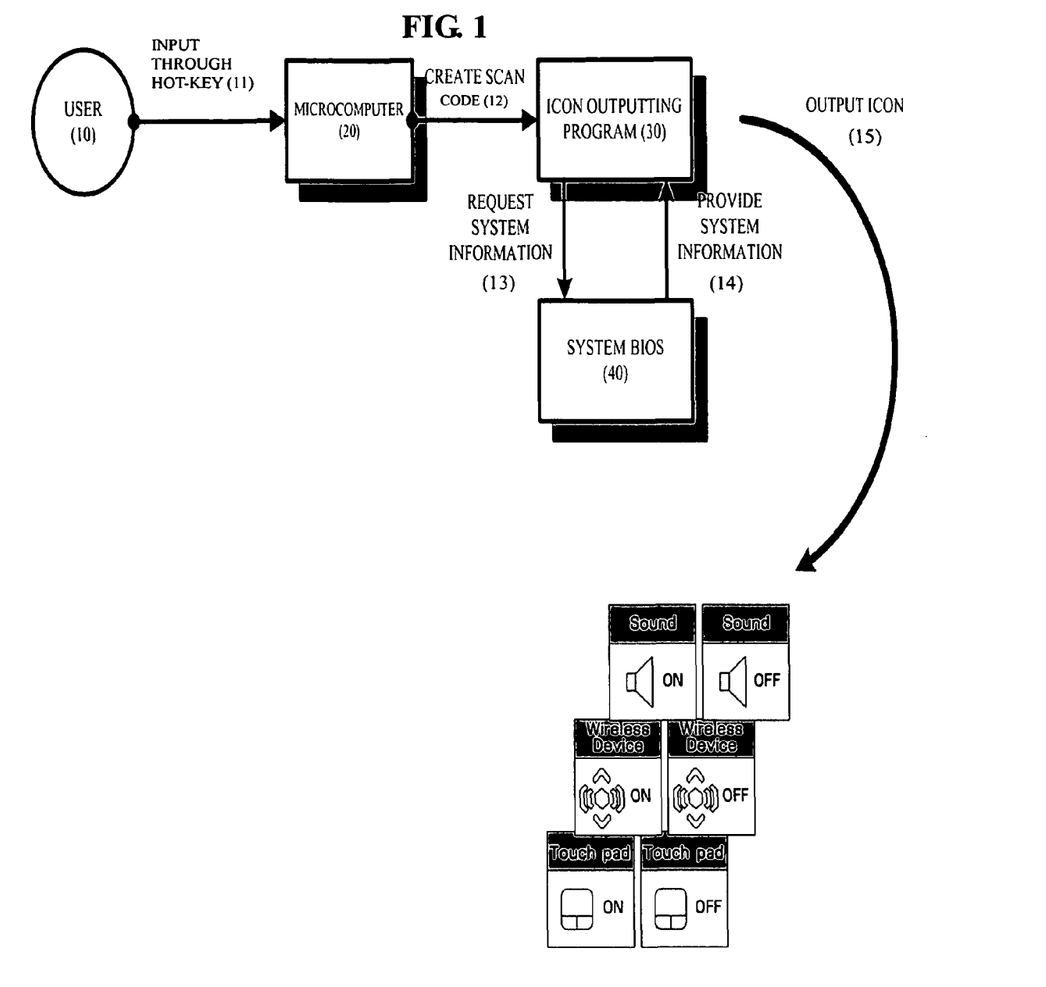
FIG. 1 is a block diagram illustrating a method of outputting an icon in response to a hot-key input according to the related art.

A conventional hot-key input method will be described with reference to FIG. 1. FIG. 1 is a block diagram illustrating a method of outputting an icon in response to a hot-key input according to the related art. When a user 10 inputs an instruction through a hot-key (11), a microcomputer 20 receives key information and creates a scan code (12) based on the key information, and an icon outputting program 30 receives the scan code and requests a system BIOS 40 to transmit information on the current state of the system (13). Then, the system BIOS 40, having received the request, provides the information on the state of the system to the icon outputting program 30 (14). The icon outputting program 30, having received the information on the state of the system, displays an icon corresponding to the hot-key on a display device (15).

However, in the conventional method of outputting an icon, the icon outputting program 30 to output a hot-key icon processes an instruction input through the hot-key of the keyboard and displays an icon. In this case, a unit in charge of analyzing the instruction input through the hot-key of the keyboard and a unit in charge of the icon display function are not separated from each other, which causes a problem in that programming efficiency is lowered. That is, the conventional hot-key icon outputting program 30 cannot reuse the instruction input through the hot-key of the keyboard.

Similarly, in the conventional hot-key input method, in which the unit to analyze the input of instructions through the hot-key and the unit in charge of the icon display function are also not separated from each other, there is a problem in that programs other than the hot-key icon outputting program 30 do not share one hot-key input event. In this case, modifying codes and testing all the codes in order for the conventional icon outputting program 30 to support a function of allowing other programs to share the one hot-key input event is necessary.

Further, the above-mentioned icon outputting program 30 is made up of applications (i.e., Windows programs). This causes a problem in that the icon cannot be output when the icon outputting program 30 is closed and cannot be output in a DOS environment.

SUMMARY OF THE INVENTION

Therefore, according to aspects of the present invention, a system and method of outputting an icon in response to a hot-key input in which a unit to analyze the input of instructions through a hot-key and a unit in charge of an icon display function are separated from each other are provided, making it possible for independent programs to perform various operations substantially simultaneously.

Further, aspects of the invention provide a system and a method of outputting an icon in response to a hot-key input in which, when a program in charge of an icon display function is not performed, a system basic input/output system (BIOS) functions as a hot-key icon outputting program instead of the program in charge of the icon display function, which makes it possible to output a hot-key icon when the icon outputting program is not available, such as in a DOS environment in which Windows does not operate.

According to an aspect of the invention, a system to output an icon in response to a hot-key input comprises a microcomputer to sense an instruction input through a hot-key and to output a scan code corresponding to the instruction, a keyboard launcher to receive the scan code from the microcomputer, to analyze the scan code, and to generate a message that requests an output of a hot-key icon indicating the operation of the hot-key based on the analyzed scan code, a system basic input/output system (BIOS) to provide information required to output the hot-key icon, and a display manager to receive the message generated by the keyboard launcher and to output the hot-key icon based on the information received from the system BIOS.

According to another aspect of the invention, a method of outputting an icon in response to a hot-key input comprises providing that a microcomputer senses an instruction input through a hot-key so as to output a scan code corresponding to the instruction, allowing a keyboard launcher to receive the scan code from the microcomputer, to analyze the scan code, and to generate a message requesting an output of a hot-key icon indicating the function of the hot-key based on the analyzed scan code, and allowing a system BIOS to provide information required to output the hot-key icon to a display manager receiving the message generated by the keyboard launcher, and allowing the display manager to output the hot-key icon based on the received information.

According to still another aspect of the invention, there is provided a method of outputting an icon in a non-operational state of a display manager to output a hot-key icon indicating an operation of a hot-key, the method comprising providing that a microcomputer senses an instruction input through the hot-key so as to output a scan code corresponding to the instruction, allowing a keyboard launcher to receive the scan code from the microcomputer, to analyze the scan code, and to generate a message requesting an output of the hot-key icon indicating the function of the hot-key based on the analyzed scan code, and allowing a system BIOS to directly receive the scan code from the microcomputer, to analyze the received scan code, and to output the hot-key icon based on the analyzed scan code.

Details of aspects of the invention other than the above-mentioned aspects are included in the detailed description of the invention and the drawings.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Embodiments of the present invention will be described below with reference to the accompanying drawings. It is to be understood that blocks in the accompanying block diagrams and compositions of operations in flow charts may be performed by computer program instructions. These computer program instructions may be provided to processors of, for example, general-purpose computers, special-purpose computers, and programmable data processing apparatuses. Therefore, the instructions performed by the computer or the programmable data processing apparatus generate executable functions described in the blocks in block diagrams or the operations in the flow charts. The computer program instructions may be stored in a computer usable memory or a computer readable memory of the computer or the programmable data processing apparatus in order to realize the functions in a specific manner. Therefore, the instructions stored in the computer usable memory or the computer readable memory may manufacture products including the instructions to perform the functions described in the blocks in the block diagrams or the operations in the flow charts. Also, the computer program instructions may be loaded onto the computer or the computer programmable data processing apparatus. Therefore, a series of operations are performed in the computer or the programmable data processing apparatus to generate a process executed by the computer, which makes it possible for the instructions performed on the computer or the programmable data processing apparatus to perform the functions described in the blocks of the block diagrams or the operations of the flow charts.

Each block or each operation may indicate a portion of a code, a module, or a segment including one or more executable instructions to perform a specific logical operation (or operations). It should be noted that, in some modifications of the invention, the functions described in the blocks or the operations may be generated in a different order. For example, two blocks or operations shown continuously may be actually performed at the same time, or they may sometimes be performed in reverse order.

Figure 2:
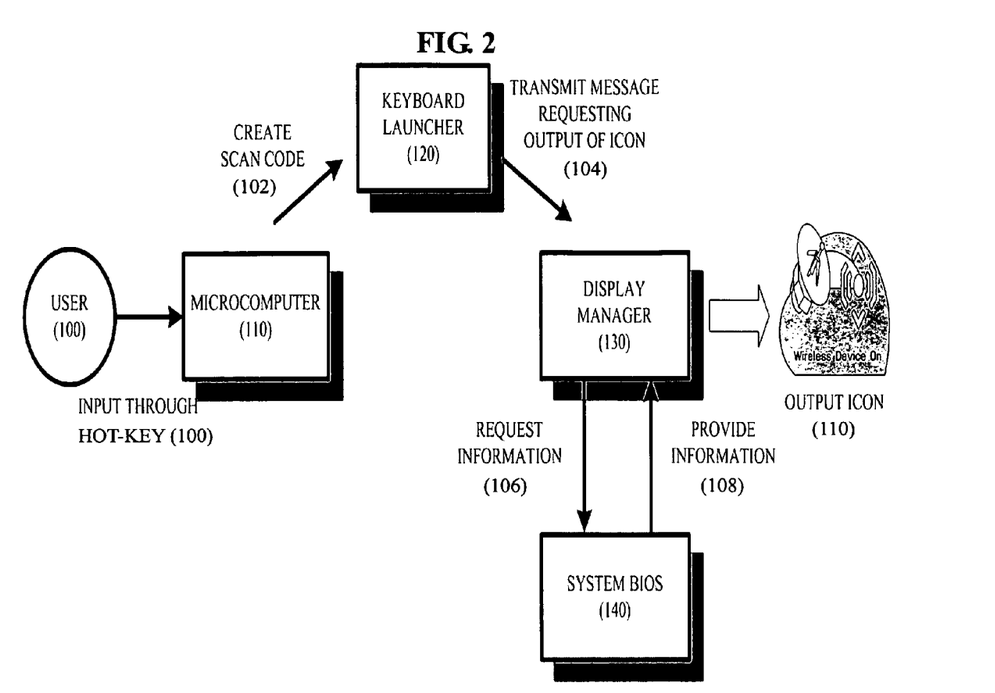
FIG. 2 is a block diagram illustrating a system for outputting an icon in response to a hot-key input according to an embodiment of the invention.

FIG. 2 is a block diagram illustrating a system to output an icon in response to a hot-key input according to an embodiment of the invention. The structure of the system to output the icon in response to the hot-key input includes a user 100, a microcomputer 110, a keyboard launcher 120, a display manager 130, and a system basic input/output system (BIOS) 140.

When the user 100 inputs an input instruction using a hot-key (100), the microcomputer 110 which includes hardware to sense the input by the hot-key of a keyboard and programs corresponding to the hot-key sense an instruction input by the hot-key and outputs a scan code corresponding to the instruction (102). Here, the scan code comprises a unique number allocated to the hot-key of the keyboard.

The keyboard launcher 120, which serves as a window application, receives the scan code from the microcomputer 110, analyzes the scan code, and generates a message requesting output of a hot-key icon indicating the operation of the hot-key based on the analyzed scan code (104).

The display manager 130 is a program to output a hot-key icon suitable for a window GUI (graphic user interface) whenever the user 100 inputs an instruction using the hot-key. The display manager 130 receives the message generated by the keyboard launcher 120 and requests the system BIOS 140 to transmit information on the system (106). Then, the system BIOS 140 provides information required to output the hot-key icon (108). The display manager 130 outputs the hot-key icon based on the provided system information (110).

As is described above, the system BIOS 140 is a program that, at the request of the display manager 130, provides the information required to output the hot-key icon to the display manager 130. The system BIOS 140 also enables a basic operation of the system.

The information provided by the system BIOS 140 may be mainly classified into two information items: a first information item relating to the current state of the system, such as the ON/OFF state of the sound of the system, the adjustment of volume, the ON/OFF state of a display device of the system, the brightness of the screen of the display device, the adjustment of the brightness, and the ON/OFF state of a touch pad of the display screen; and a second information item relating to the display device connected to the system. Although it is understood that the first information item may include the second information item from a conceptual viewpoint, according to embodiments of the invention the first and second information item are nevertheless discriminated from each other.

In the first case, when the hot-key icon output by the display manager 130 is used to change the current state of the system, that is, when the sound is turned on, an operation of the touch pad is turned off, or a brightness of the display screen is changed, the system BIOS 140 stores information indicating the states after the change.

The display manager 130 controls the size and transparency of the hot-key icon, according to the current resolution of the screen, and outputs the hot-key icon accordingly. The size of the icon may be output at a constant ratio corresponding to the current resolution of the screen. Unlike existing hot-key icons, the hot-key icon according to this embodiment may have no rectangular window-shaped frame and may appear to be transparent on the display screen. That is, the icon may be output in any shape without restrictions on the shape of the existing window.

In the second case, available combinations of display devices currently connected to the system are displayed on the screen so that the user may be able to select one of them. That is, the display manager 130 receives the information on the display devices and outputs at least one icon representing a combination of display devices which are simultaneously selected with the display devices. At that time, when the same input instruction as that input by the hot-key is not input within a predetermined time, the display manager 130 selects an icon representing a combination of display devices specified in a default state, from at least one combination of display devices currently output, and then outputs the selected icon.

If, when the same input instruction as that input by the hot-key is reinput within a predetermined time, the display manager 130 selects one of the at least one combination of display devices currently being output, while sequentially moving the icons representing combinations of display devices besides those display devices that are selected before the reinput of the input instruction, and outputs the selected combination of display devices.

Here, although the predetermined time depends on a selection of the user, in an embodiment of the invention, the predetermined time may be set as a default time in the range of approximately 2 to 3 seconds. Further, when the number of device combinations is larger than 5, 5 device combinations are displayed on the screen. However, the selected icon is moved when the hot-key input is performed, which makes a selection of all the icons not displayed on the screen possible.

When the operation of the display manager 130 ends, the system BIOS 140 functions as the display manager 130. In this case, the system BIOS 140 analyzes the scan code received from the microcomputer 110 and outputs a hot-key icon corresponding to the analyzed scan code.

Meanwhile, when the display manager 130 does not operate, or when a Windows environment other than a DOS environment is employed, the system BIOS 140 operates as the display manager 130. In this case, the system BIOS 140 analyzes the scan code directly received from the microcomputer 110 and outputs a hot-key icon corresponding to the analyzed scan code.

Figure 3:
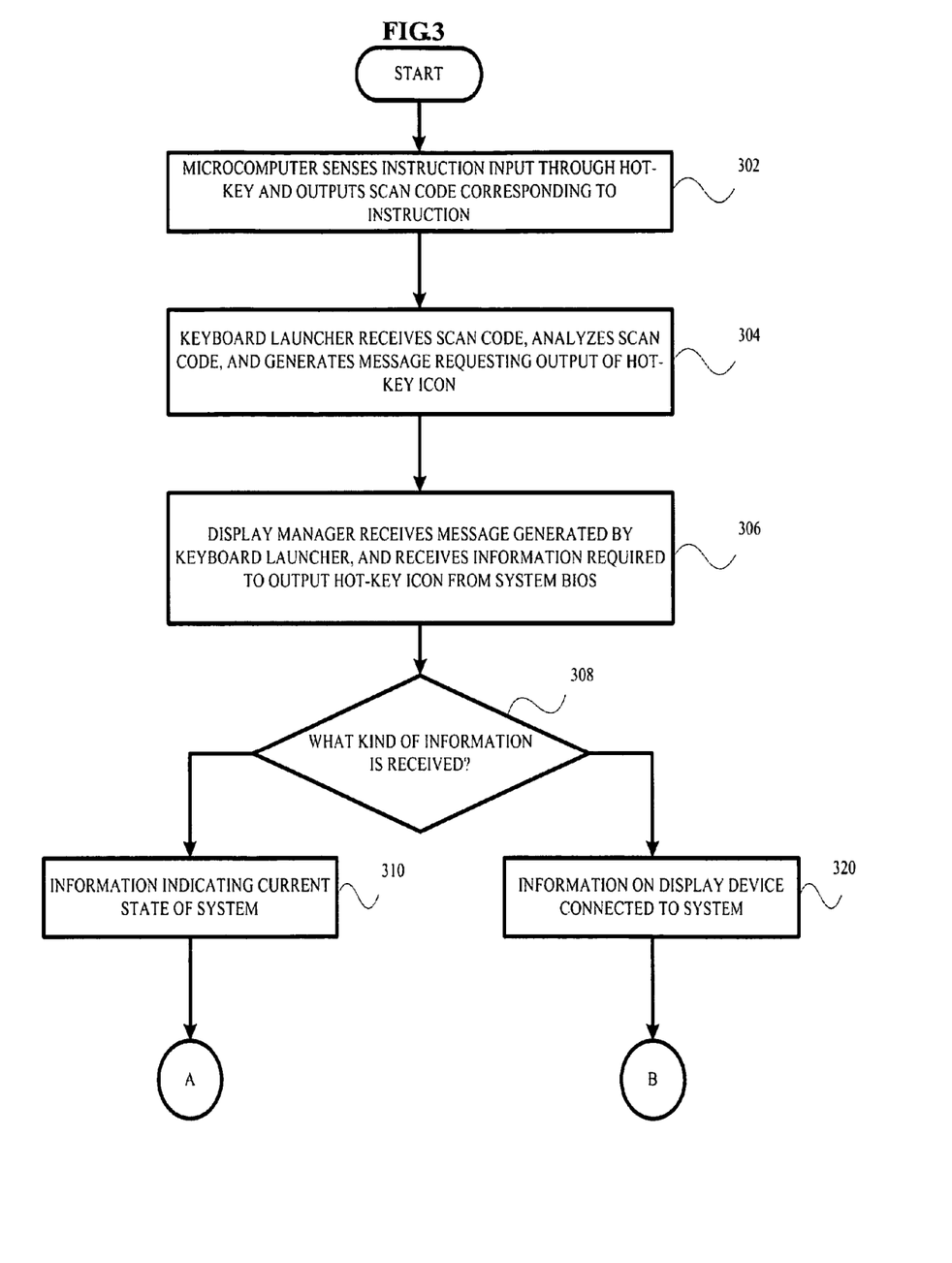
FIG. 3 is a flow chart illustrating a method of outputting an icon in response to a hot-key input according to an embodiment of the invention.
Figure 4A:
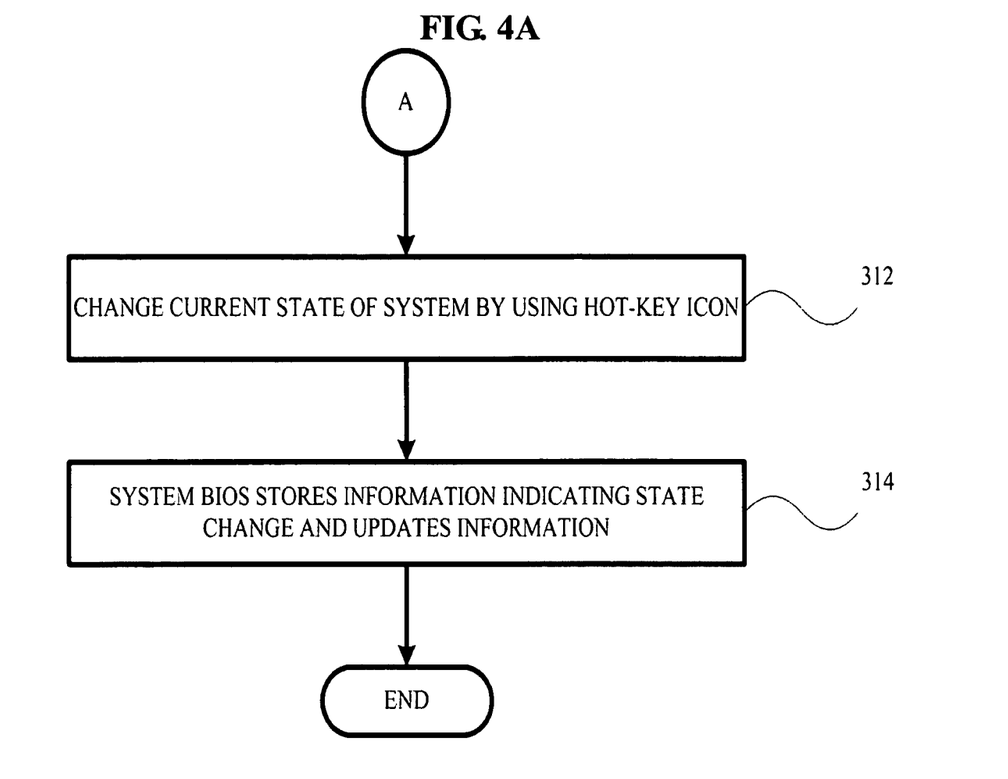
FIGS. 4A and 4B are flow charts illustrating a method of outputting an icon in response to a hot-key input.
Figure 4B:
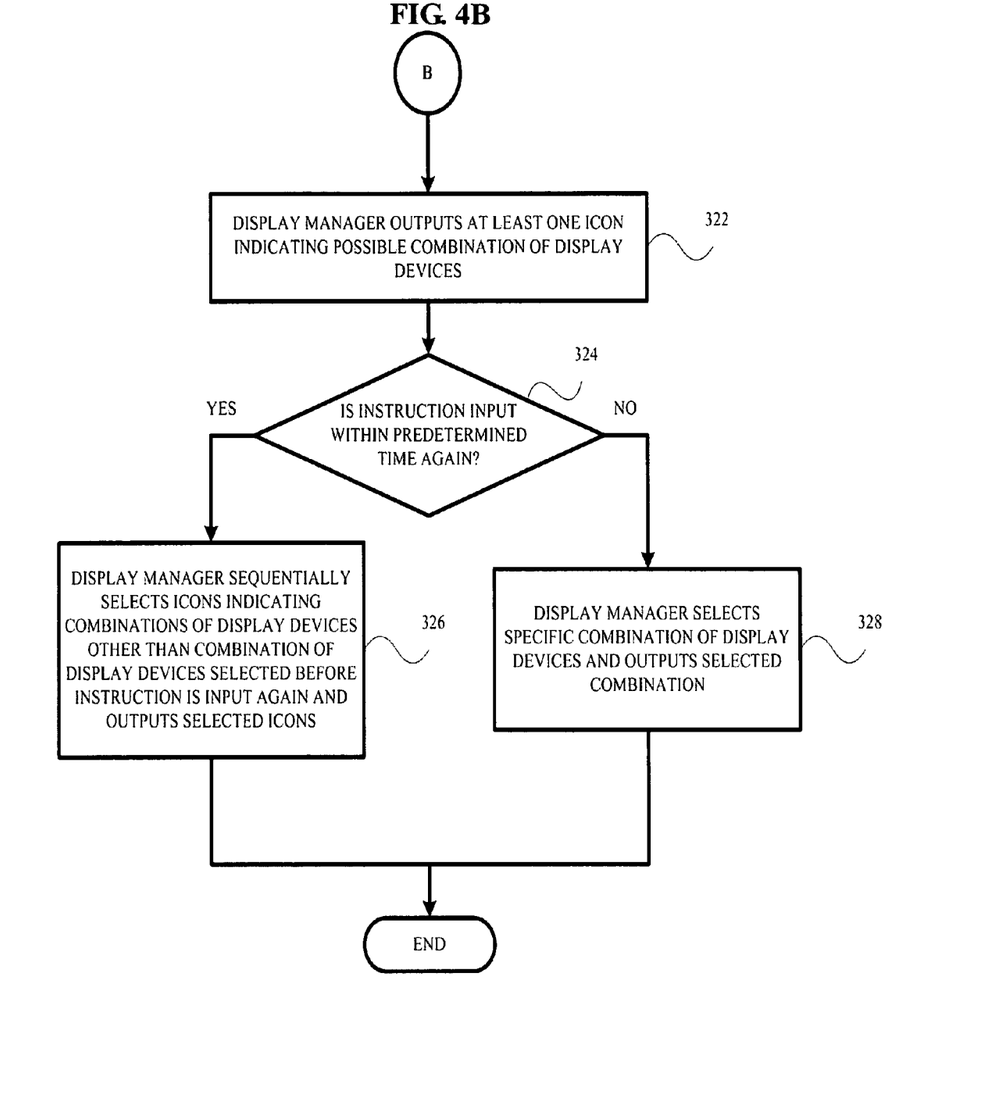

Next, the overall flow of a method of outputting icons according to an aspect of the invention will be described with reference to FIGS. 3, 4A, and 4B. FIG. 3 is a flow chart illustrating a method of outputting an icon in response to a hot-key input according to an embodiment of the invention. FIGS. 4A and 4B are flow charts illustrating a method of outputting an icon in response to a hot-key input.

First, the microcomputer 110 senses an instruction input by the user 100 through a hot-key and outputs a scan code corresponding to the instruction (302). The keyboard launcher 120 receives the scan code from the microcomputer 110 and analyzes the scan code. Then, the keyboard launcher 120 generates a message requesting output of a hot-key icon indicating the operation of the hot-key based on the analyzed scan code (304).

The display manager 130 receives the message generated by the keyboard launcher 120, and also receives information required to output the hot-key icon from the system BIOS 140 (306). At that time, the kinds of information items that are included in the received information is determined (308). When it is determined that information items indicating the current state of the system, such as the ON/OFF state of the sound of the system, the brightness of the display screen of the system, and the ON/OFF state of the function of the tough pad of the display screen, are included (310), the process shown in FIG. 4A is performed. Meanwhile, when information on the display device currently connected to the system is received, the process shown in FIG. 4B is performed.

When information on the current state of the system is determined to have been received (310), the user 100 uses the hot-key icon output by the display manager 130 to change the current state of the system (312). For example, the user 100 uses the hot-key icon to turn on the sound of the system or to turn off the operation of the touch pad. Then, the system BIOS 140 stores information indicating the state change, to update the information (314).

Figure 7:
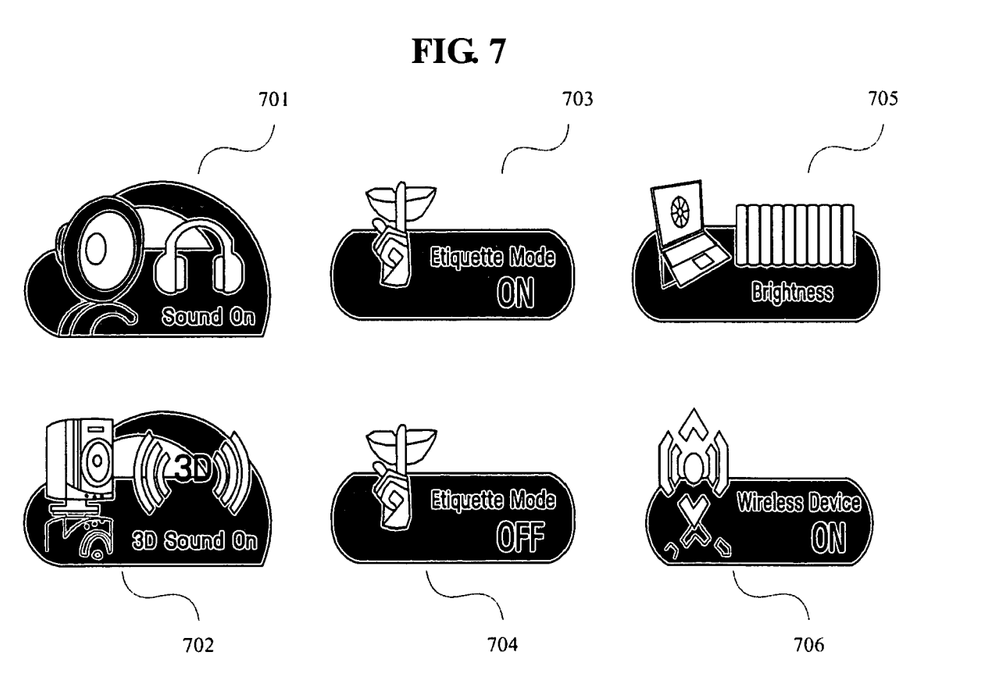
FIG. 7 is a diagram illustrating the shapes of icons output in response to a hot-key input according to the first embodiment of the invention.

Referring to FIG. 7, it is noted that FIG. 7 is a diagram illustrating the shapes of the icons output in response to a hot-key input. FIG. 7 shows, for example, an icon 701 representing the ON state of a sounder, an icon 702 representing the ON state of a three-dimensional (3D) sound, an icon 703 representing that the sounder is temporally turned off (i.e., an icon representing that the etiquette mode is turned on), an icon 704 representing that the etiquette mode is turned off, an icon 705 to adjust the brightness of the screen, and an icon 706 representing that a wireless apparatus is connected to the system.

Meanwhile, when determining that information on the display device currently connected to the system is received (320), the display manager 130 outputs at least one icon representing a combination of display devices simultaneously selected with the display device connected to the system (322). Then, whether an instruction is input through the hot-key within a predetermined time again is determined (324).

When an instruction is input by the hot-key and then the same instruction is reinput within a predetermined time, the display manager 130 sequentially displays icons indicating combinations of display devices other than the combination of display devices selected before the reinput of the instruction, among the at least one combination of display devices currently output, and outputs the icons, with one combination selected therefrom (326).

On the other hand, when an instruction is input by the hot-key, but the same instruction is not reinput within a predetermined time, the display manager 130 selects an icon indicating a specific combination of display devices from the at least one combination of display devices currently being output (328). Here, although the predetermined time depends on the user, in an embodiment of the invention, the predetermined time may be set in the range of approximately 2 to 3 seconds. In addition, as described above, the hot-key icon may be output, with the size and transparency thereof adjusted to correspond to the resolution of the screen that is currently output.

Figure 5:
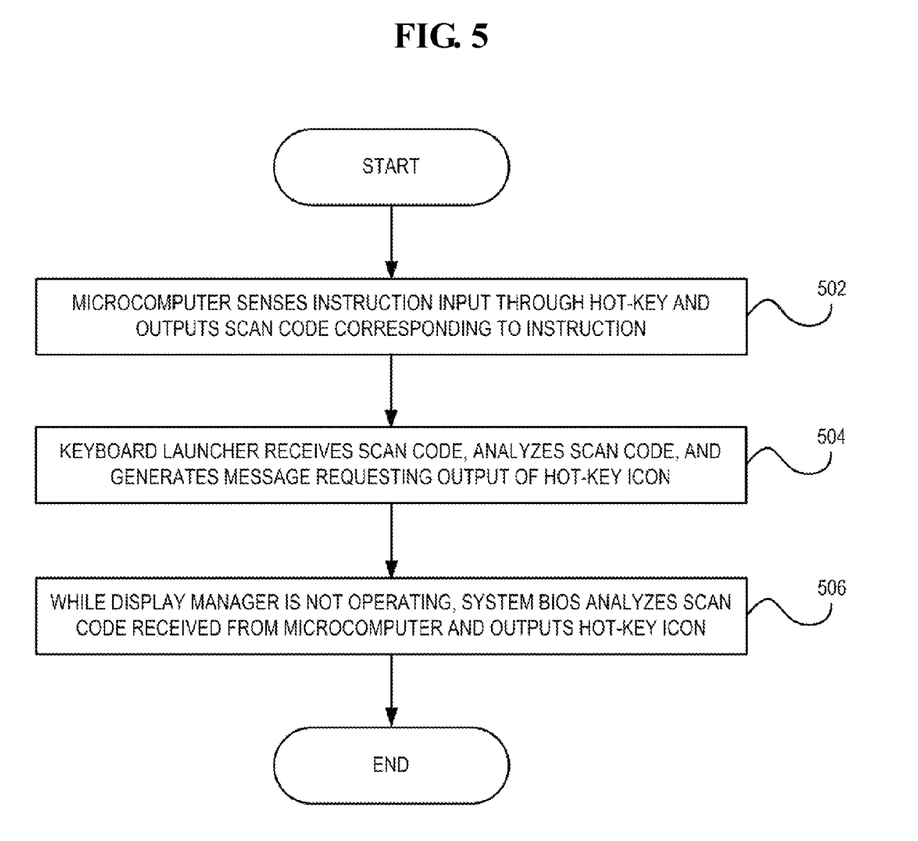
FIG. 5 is a flow chart illustrating a method of outputting an icon in response to a hot-key input according to a second embodiment of the invention.

FIG. 5 is a flow chart illustrating a method of outputting icons in response to a hot-key input according to a second embodiment of the invention. The second embodiment relates to a method of outputting the icons when the operation of the display manager 130 is ended.

First, the microcomputer 110 senses an instruction input through a hot-key and outputs a scan code corresponding to the instruction (502). The keyboard launcher 120 receives the scan code from the microcomputer 110 and analyzes the scan code. Then, the keyboard launcher 120 generates a message requesting an output of a hot-key icon indicating the operation of the hot-key based on the analyzed scan code (504). The above-mentioned processes are similar to those of the first embodiment. However, the following processes are different from those of the first embodiment. The system BIOS 140 analyzes the scan code directly received from the microcomputer 110 and outputs a hot-key icon corresponding to the analyzed scan code (506). This configuration makes the inputting of instructions using the hot-key icon possible even when the display manager 130 is not operating (e.g., before the user logs onto the system or in the DOS environment, or when the operation of the display manager 130 is ended).

Figure 6:
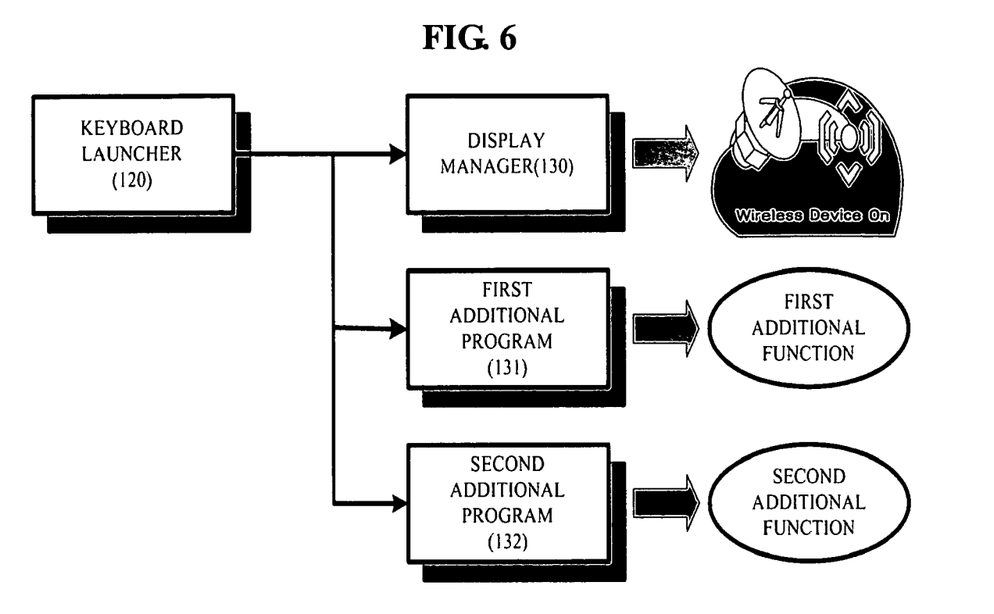
FIG. 6 is a flow chart illustrating a method of outputting an icon in response to a hot-key input according to a third embodiment of the invention.

FIG. 6 is a block diagram illustrating a method of outputting an icon in response to a hot-key input according to a third embodiment of the invention. In this embodiment, the keyboard launcher 120 to analyze an input by the hot-key is separated from the display manager 130 to output hot-key icons on the screen, and applications, such as a first additional program 131 and a second additional program 132, are arranged to be independent from the display manger 130. Therefore, the applications receive messages related to information on the function of the hot-key from the keyboard launcher 120 and independently perform their respective operations.

Meanwhile, it will be understood by those skilled in the art that the invention may also be realized as a computer readable recording medium having stored therein a program to allow a computer to execute the methods according to the embodiments of the invention.

According to the above-described aspects of the invention, the following effects are obtained. The keyboard launcher to analyze an input by a hot-key and the display manager to output hot-key icons are separated from each other and are independently driven, which makes independently developing additional programs, other than the display manager, possible, and makes it possible for the additional programs to simultaneously perform various operations in response to instructions input through hot-keys.

Further, when a program to output the hot-key icons on the screen is not executed, the system BIOS functions as the program to output the hot-key icons on the screen, which makes it possible to output the hot-key icons even when the program for outputting the hot-key icons is not available, such as in a DOS environment.

Furthermore, there are no restrictions on the shape of the hot-key icon, and transparent hot-key icons may be provided to the user, which makes providing user-oriented hot-key icons possible.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system to output an icon in response to a hot-key input, comprising:
    a microcomputer to sense an instruction input through a hot-key and to output a scan code corresponding to the instruction;
    a keyboard launcher to receive the scan code from the microcomputer, to analyze the scan code, and to generate a message that requests an output of a hot-key icon indicating the operation of the hot-key based on the analyzed scan code;
    a system basic input/output system (BIOS) to provide information required to output the hot-key icon; and
    a display manager separate from the keyboard launcher to receive the message generated by the keyboard launcher, to determine kinds of information items that are included in the information received from the system BIOS, and to output the hot-key icon based on the determination results;
    wherein, while the display manager is not operating, the system BIOS directly receives the scan code from the microcomputer, analyzes the scan code, and outputs the hot-key icon corresponding to the analyzed scan code.

2. The system according to claim 1, wherein the system BIOS provides information indicating the current state of the system to the display manager.

3. The system according to claim 2, wherein, when the current state of the system is changed, the system BIOS stores information indicating the state change via the hot-key icon output by the display manager.

4. The system according to claim 2, wherein, when the current state of the system is changed, the system BIOS stores information indicating the state change.

5. The system according to claim 1, wherein the system BIOS provides information on a display device currently connected to the system to the display manager.

6. The system according to claim 5, wherein the display manager receives the information on the display device and outputs at least one icon indicating a combination of display devices that are simultaneously selected with the display device.

7. The system according to claim 6, wherein, when an instruction which is substantially similar to the instruction input through the hot-key is not input within a predetermined time, the display manager selects the icon indicating a combination of display devices of the at least one combination of display devices currently output, and
    when an instruction which is substantially similar to the instruction input through the hot-key is input within the predetermined time, the display manager sequentially selects icons indicating the combinations of display devices other than the combination of display devices selected before the instruction is input again, out of the at least one combination of display devices currently being output.

8. The system according to claim 1, wherein the display manager adjusts a size and a transparency of the hot-key icon according to a resolution of a screen which is being currently output, and outputs the hot-key icon accordingly.

9. The system of claim 1, wherein the keyboard launcher transmits the message to the display manager and at least one additional application other than the display manager.

10. A method of outputting an icon in response to a hot-key input, comprising:
    providing that a microcomputer senses an instruction input through a hot-key so as to output a scan code corresponding to the instruction;
    allowing a keyboard launcher to receive the scan code from the microcomputer, to analyze the scan code, and to generate a message requesting an output of a hot-key icon indicating a function of the hot-key based on the analyzed scan code;

allowing a system BIOS to provide information required to output the hot-key icon to a display manager receiving the message generated by the keyboard launcher, the display manager being separate from the keyboard launcher, and allowing the display manager to determine kinds of information items that are included in the information received from the system BIOS, and to output the hot-key icon based on the determination results; and while the display manager is not operating, allowing the system BIOS to directly receive the scan code from the microcomputer, analyze the scan code, and output the hot-key icon corresponding to the analyzed scan code.

11. The method according to claim 10, wherein the information required to output the hot-key icon comprises information indicating the current state of the system.

12. The method according to claim 11, wherein the outputting of the hot-key icon comprises allowing the system BIOS to store information indicating the state change, thereby updating information when the current state of the system is changed by the hot-key icon output by the display manager.

13. The method according to claim 10, wherein the information required to output the hot-key icon comprises information on a display device currently connected to the system.

14. The method according to claim 13, wherein the outputting of the hot-key icon further comprises allowing the display manager receiving the information on the display device to output at least one icon indicating a combination of display devices simultaneously selected with the display device.

15. The method according to claim 14, further comprising, when an instruction which is the same as the instruction input through the hot-key is not input within a predetermined time, allowing the display manager to select the icon indicating a combination of display devices of the at least one combination of display devices currently output, and, when an instruction which is the same as the instruction input through the hot-key is input within the predetermined time, allowing the display manager to sequentially select icons indicating the combinations of display devices other than the combination of display devices selected before the instruction is reinput, out of the at least one combination of display devices currently output.

16. The method according to claim 10, wherein the hot-key icon is output with a size and transparency that are adjustable according to a resolution of a screen currently output.

17. A computer readable medium comprising a program to allow a computer to execute the method of claim 10.

* * * * *